United States Patent
Kook et al.

Patent Number: 6,068,214
Date of Patent: May 30, 2000

[54] SYSTEM FOR SECURING A SUPPORT TO AN AIRCRAFT FLOOR

[75] Inventors: Manfred Kook; Wolfram Schopenhauer, both of Hamburg, Germany

[73] Assignee: Daimler Chrysler Aerospace Airbus GmbH, Hamburg, Germany

[21] Appl. No.: 09/005,552

[22] Filed: Jan. 12, 1998

[30] Foreign Application Priority Data

Jan. 10, 1997 [DE] Germany ............................ 197 00 543

[51] Int. Cl.⁷ ........................................................ B64D 9/00
[52] U.S. Cl. .................... 244/118.1; 246/119; 246/118.6; 410/69; 410/105
[58] Field of Search ................................ 244/119, 118.1, 244/118.6, 137.1, 137.3, 117 R; 410/69, 105, 77–84, 92, 95

[56] References Cited

U.S. PATENT DOCUMENTS

| | | |
|---|---|---|
| 2,625,118 | 1/1953 | Lechner . |
| 2,735,377 | 2/1956 | Elsner ...................................... 410/105 |
| 3,381,921 | 5/1968 | McDonough et al. ................ 244/137.1 |
| 3,612,316 | 10/1971 | Baldwin et al. ..................... 244/137.1 |
| 3,753,541 | 8/1973 | Grueber et al. . |
| 4,185,799 | 1/1980 | Richards, Jr. ............................ 410/105 |
| 4,234,278 | 11/1980 | Harshman et al. ........................ 410/69 |
| 4,696,609 | 9/1987 | Cole .......................................... 410/69 |

FOREIGN PATENT DOCUMENTS

| | | | |
|---|---|---|---|
| 349493 | 11/1960 | Switzerland . | |
| 2167354 | 5/1986 | United Kingdom ................... | 410/105 |

*Primary Examiner*—Galen L. Barefoot
*Attorney, Agent, or Firm*—W. F. Fasse; W. G. Fasse

[57] ABSTRACT

Supports such as a pallet carrying aircraft passenger seats or a bottom of a freight container are secured to a floor structure in an aircraft. For this purpose the floor structure includes floor stringers (5) supported on and secured to floor joists (11). The stringers (5) are U-rails having an upwardly open U-cross-section with a first interlocking member (8) in the U-cross-section. An adapter (4, 13) having a present existing stud (8) and shear pin system (8A) is secured in the U-rail of the stringers (5). The adapter (4) is secured to or securable to the support by a latching (2, 3). Another adapter (13) carries rotatable rollers or roller balls that project slightly above an upwardly facing floor level to permit, for example, freight containers or seat pallets to roll along the floor. Instead of adapter (13) it is also possible to install a present existing container latch carrier (14) in the present stringer (5).

14 Claims, 5 Drawing Sheets

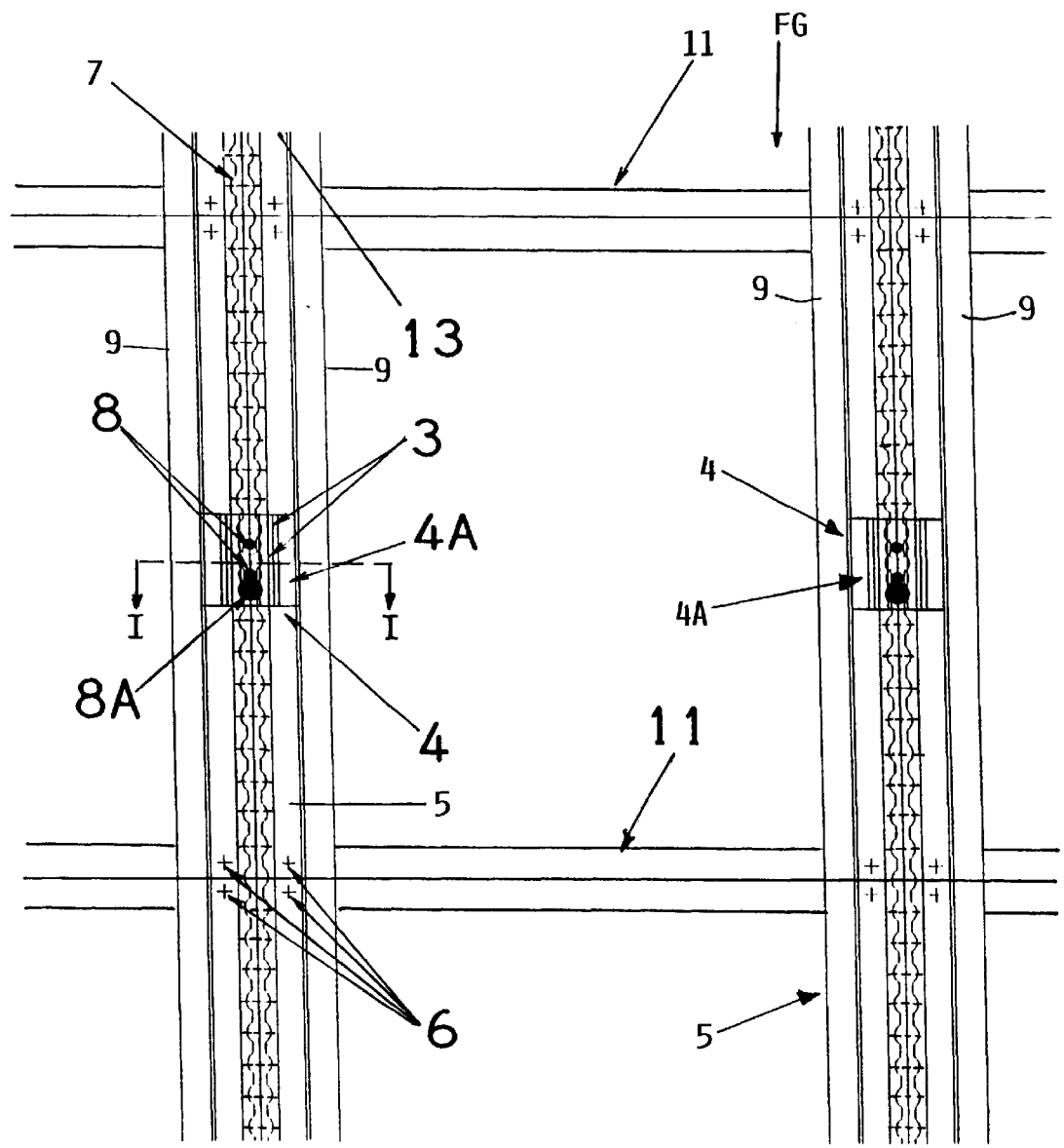

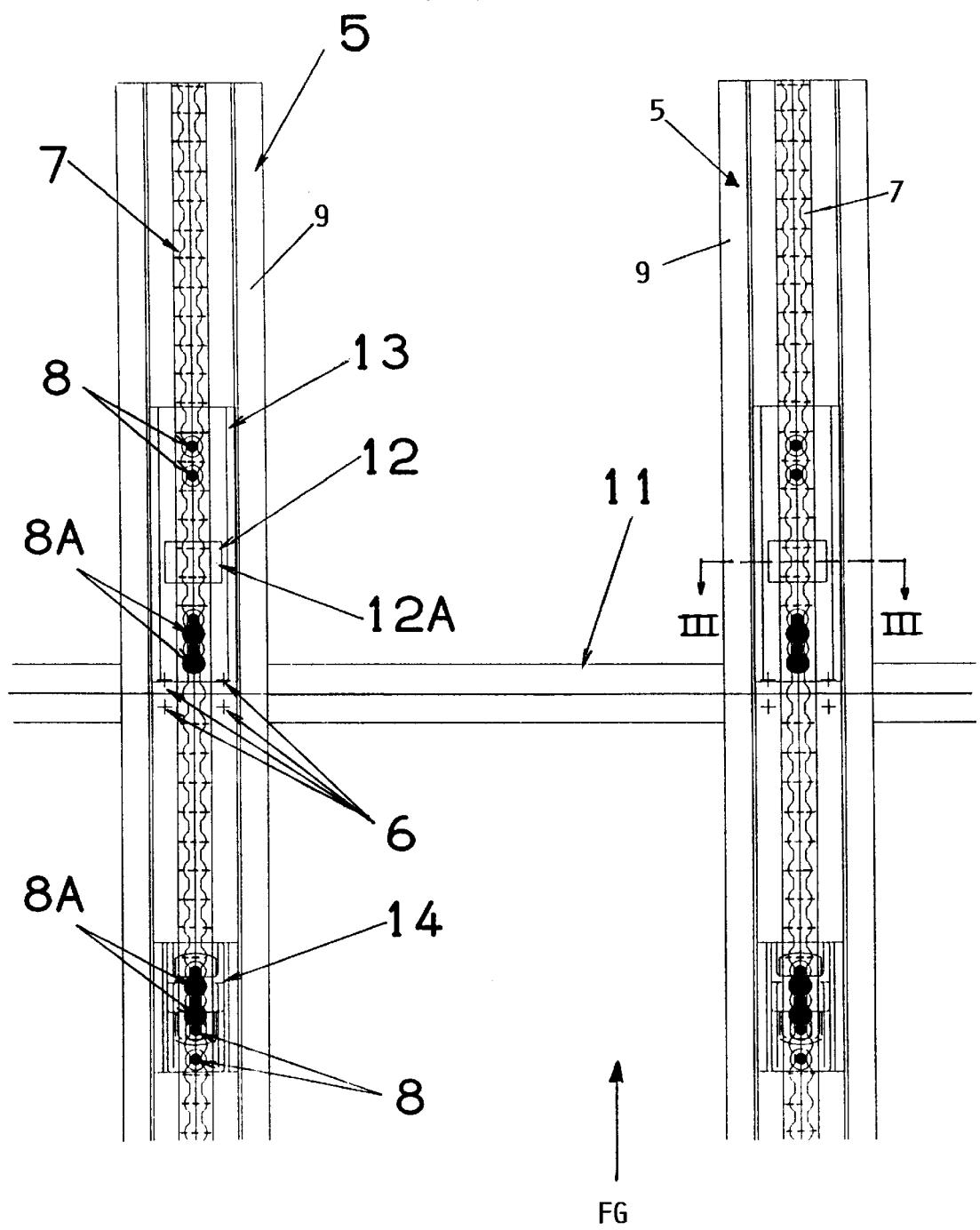

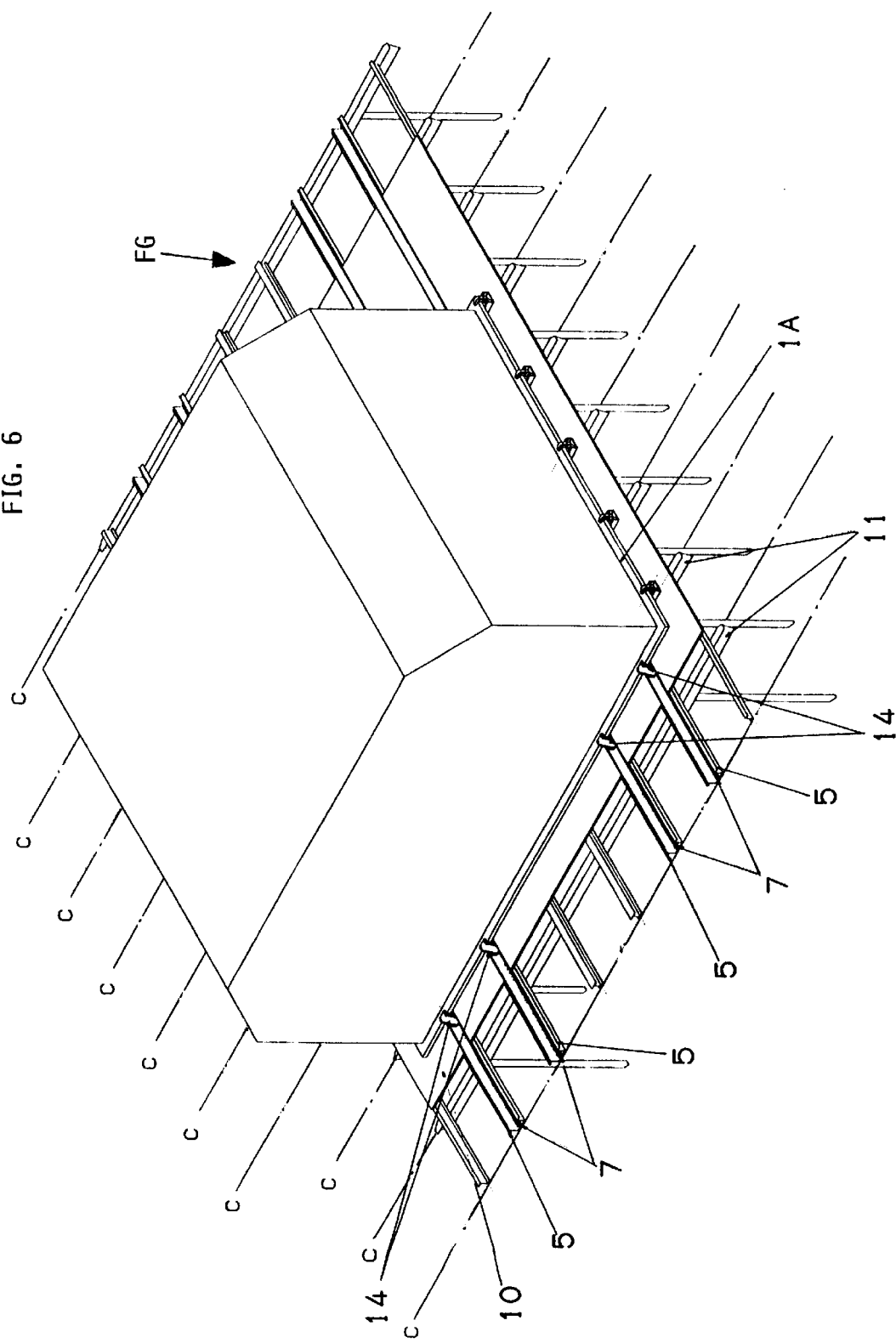

SYSTEM FOR SECURING A SUPPORT TO AN AIRCRAFT FLOOR

PRIORITY CLAIM

This application is based on and claims the priority under 35 U.S.C. §119 of German Patent Application 197 00 543.8, filed on Jan. 10, 1997. The entire disclosure of German Patent Application 197 00 543.8 is incorporated herein by reference.

FIELD OF THE INVENTION

The invention relates to securing a support such as a pallet carrying passenger seats or the bottom of an LD freight container to the floor of an aircraft which can be the cabin floor or the loading floor.

BACKGROUND INFORMATION

The above mentioned supports in the form of pallets or the freight container bottoms are equipped with interlocking elements or latching devices for securing the supports to a floor in the aircraft. Where the floor is a loading floor, it is normally equipped with transport rollers or ball elements forming a floor surface on which freight container bottoms can be moved.

Various freight latching system for securing pallets and containers to a floor in an aircraft are known in the art. Such systems include latching elements for securing the pallets or containers to the floor grid structure of the aircraft. Efforts have been made to reduce the weight of such systems and to minimize loss in vertical loading height above the respective floor. For example, conventional pallets carrying passenger seats installed on a cabin floor in an aircraft reduce the initially available cabin height by about three inches which in turn reduces the passenger comfort.

Swiss Patent Publication CH 349,493 discloses a system for transporting and latching freight containers or freight pallets to the cross-beams of a floor grid structure in an aircraft. Such a system requires that the bottoms of the containers or the pallets are equipped with interlatching elements and the floor structure must be equipped with transport rollers for moving the containers or pallets into a latching position. In the floor structure U-sectional stringers are secured to cross-joists to form a floor grid. Latching elements are secured to the pallets and containers and to the floor grid structure at predetermined spacings from one another. These spacings are determined by the spacings between the latching elements secured to the containers and pallets. Additionally, each pallet and container must be provided with its own rollers or roller balls for rolling along the floor. The longitudinal stringers are so constructed that their inner upwardly facing sides provide a surface on which the rollers or balls of the pallets or freight containers can roll along into the latching position. The need for each container and each pallet to be equipped with its own transport rollers secured to the underside of the platform or container bottom is a disadvantage because these rollers or ball rollers take up vertical space.

U.S. Pat. No. 2,625,118 discloses an apparatus for securing freight containers to the cross-joists of the aircraft floor grid structure. In the known system rail elements are secured to the cross-joists and these rail elements cooperate with latching elements and with the transport rollers of the freight containers. These rail sections are so positioned that they project out of approximately U-shaped grooves above the floor level in the aircraft so that the transport rollers of the freight containers must travel at a substantial spacing between the container downwardly facing bottom surface and the top floor level. Such a system wastes vertical loading space and therefore leaves room for improvement in reducing the vertical height that is required for moving pallets and/or freight containers along the floor.

OBJECTS OF THE INVENTION

In view of the above it is the aim of the invention to achieve the following objects singly or in combination:

to provide a system for latching containers or pallets to the floor of an aircraft whereby the latching system is constructed to have a reduced height and so that the available height in the passenger cabin or in the loading space is increased compared to conventional systems;

to provide an adapter between the latching elements and the floor stringers or longitudinal beams whereby the adapter is substantially completely recessed in upwardly open U-shaped stringers of the floor grid structure; and to avoid the need for rollers or roller balls secured to the pallets or freight containers and to recess such roller or roller balls substantially completely in the floor grid structure.

SUMMARY OF THE INVENTION

A system for securing a support to an aircraft floor comprises according to the invention floor joists (11) for mounting in an aircraft body, at least one floor stringer (5) supported by the floor joists (11) and extending at an angle to the floor joists, substantially longitudinally in the aircraft. The floor stringer (5) has an upwardly open U-cross-sectional configuration and a first interlock member (8) in the floor stringer. An adapter (4, 13) fits slidably into the U-cross-section of the floor stringer and has a second interlock member (8A) for cooperating with the first interlock member (8) for interlocking the adapter to the stringer in an interlock (7). The system further comprises latching devices for securing the support to the adapter or to the floor. The latching devices include, for example a latch and bolt connection between the adapter and the support such as a pallet (1) or any other interlocking suitable for securing the support to the adapter. Conventional latches may be used to secure a freight container to the floor once the container has rolled into a latching position on rollers or roller balls that are mounted in this special stringer (5) according to the invention.

In a preferred embodiment the first and second interlocking members comprise tongue and groove members secured to the floor stringers and to the adapter or vice versa, whereby the interlocking members of the stringer are interrupted to provide spaces for the insertion of the interlocking member of the adapter into the interlocking member of the floor stringers or vice versa.

Compared to conventional seat carrying pallet or freight container latching systems, the invention has the advantage that the cabin height between the top surface of the cabin floor and the ceiling has been increased by at least about two inches since the present latching system for pallets merely requires about one inch. In the embodiment relating to freight containers, there is no loss in the height of the loading space between the loading floor and the ceiling above the loading floor because the rollers or roller balls of the freight containers fit substantially completely into the above mentioned U-shaped floor stringers according to the invention.

The rollers or roller balls project above the floor level just enough for the container bottoms to freely ride on the rollers or ball rollers.

The floor stringers according to the invention replace the conventional seat mounting rails. In the freight container embodiment the U-shaped adapter which holds the container rollers or roller balls is received entirely in the U-shaped stringer.

Another advantage is seen in that existing containers and existing seat pallets can be used in the present system, whereby the present latching devices (2) of the seat pallets cooperate with the adapter (4). In the freight container embodiment any latching can be used. These characteristics of the invention provide a substantial flexibility for example with regard to the seat arrangements so that various customer wishes can be easily satisfied because the adapters (4, 13) can be placed anywhere along the stringers.

BRIEF DESCRIPTION OF THE DRAWINGS

In order that the invention may be clearly understood, it will now be described, in connection with an example embodiment of the invention with reference to the drawings, wherein:

FIG. 2 shows a plan view onto a floor grid structure with stringers and adapters according to the invention as shown in FIG. 1;

FIG. 4 is a view similar to FIG. 2, however showing the floor grid structure equipped with adapters for the mounting of rollers in the stringers and with conventional latch carriers;

FIG. 6 is a perspective view similar to FIG. 4, but showing a freight container instead of a seat pallet.

DETAILED DESCRIPTION OF PREFERRED EXAMPLE EMBODIMENTS AND OF THE BEST MODE OF THE INVENTION

Figure 1:
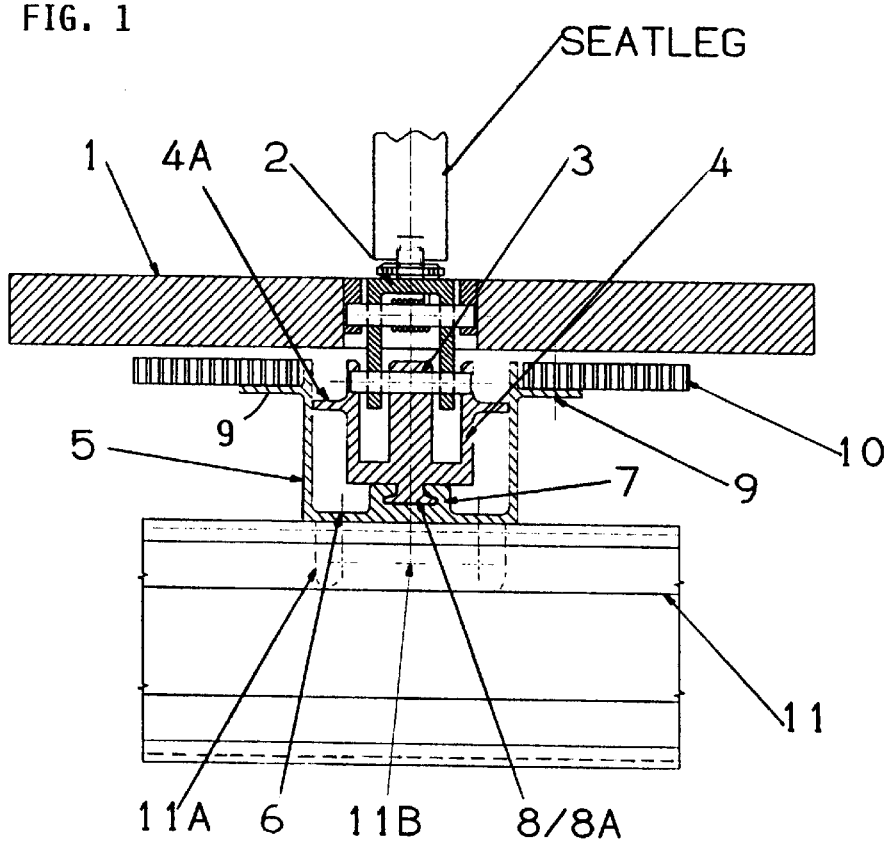
FIG. 1 is a sectional view along section line I—I in FIG. 2, through a floor stringer according to the invention for a floor grid structure in an aircraft for securing a support such as passenger seat carrying pallets to the floor grid structure.
Figure 3:
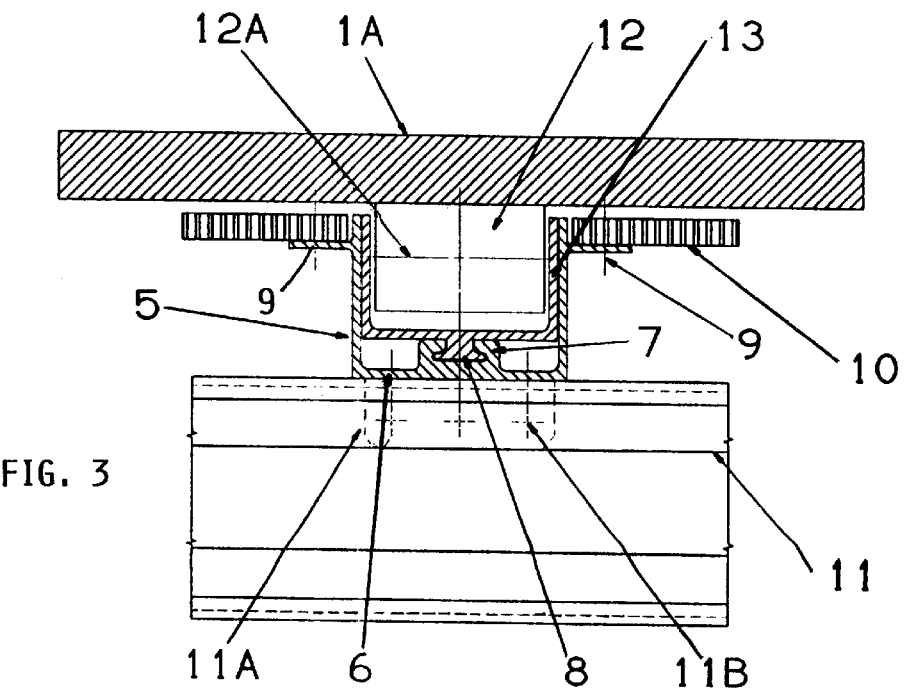
FIG. 3 is a sectional view along section line III—III in FIG. 4 illustrating the mounting of rollers with an adapter in a stringer according to the invention for permitting freight containers or seat carrying pallets to roll along on the rollers mounted in the stringers.

Referring first to FIGS. 1 to 4, a floor grid FG is formed of supporting cross-joists 11 and stringers 5 according to the invention extending in the direction of the longitudinal aircraft axis. The stringers 5 are secured to the cross-joists 11 by gusset brackets 11A and welding and/or screws or rivets 6, 11B. The joists 11 extend cross-wise to the longitudinal aircraft axis. Normally, the crossing angle between joists 11 and stringers 5 will be 90°, but the invention is not limited to that angle. Each stringer 5 has, according to the invention, a U-cross-sectional configuration forming a U-rail, as best seen in FIGS. 1 and 3, and faces with its open side upwardly. Each stringer 5 of the invention is equipped with a seat rail 7 having an interrupted crown for cooperation with interlocking members 8/8A. The seat rail 7 is provided either with a groove or with a tongue for the cooperation with the interlocking members 8/8A and/or with adapters 4, 13. Preferably, but not necessarily, the seat rail 7 is an integral part of the bottom web of the U-rail 5, as will be described in more detail below.

In FIG. 1, one of the interlocking members 8 or 8A is part of an adapter 4 which can be inserted in the stringer 5 in any position along the length of the seat rail 7 in the stringer 5 at spacings or intervals of about one inch provided in the crown of the seat rail 7 as best seen in FIGS. 2 and 4. The interlocking members are then fixed in position by moving them for about one half inch in the length direction of the stringers 5 in parallel to the longitudinal aircraft axis, thereby interlocking in the crown of the seat rail 7, which according to the invention is an integral or attached part of the present stringers 5. The interlocking members 8/8A include a conventional shear pin system 8A that is pressed downwardly for the interlocking with the crown of the seat rail crown 7.

Figure 5:
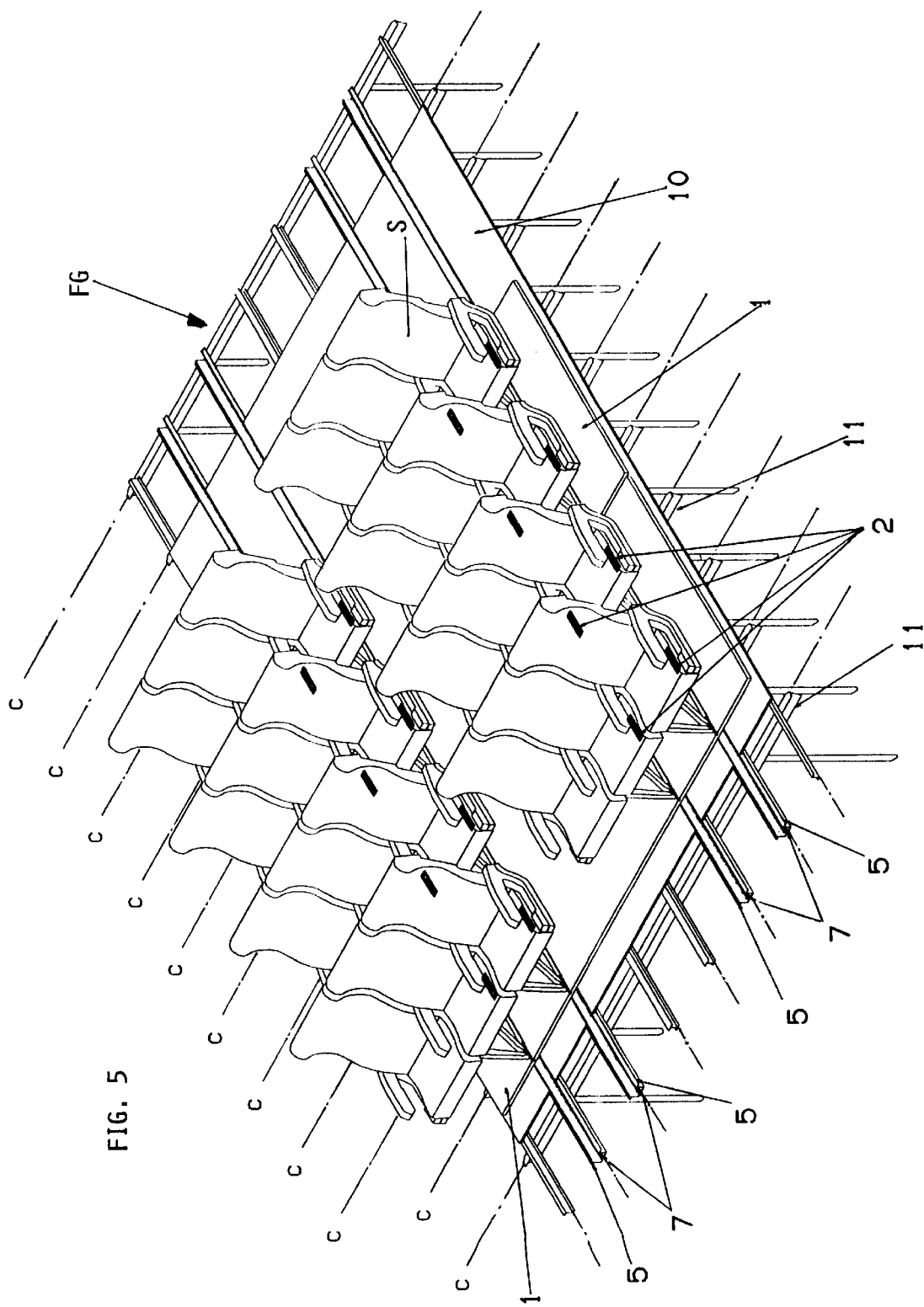
FIG. 5 is a perspective view of seat pallets carrying passenger seats secured to a floor grid structure with stringers according to the invention.

FIG. 1 shows an embodiment in which a support 1 is a pallet carrying aircraft passenger seats S best seen in FIG. 5. A latching mechanism 2 secures the pallet 1 with the help of a bolt connecter 3 to an adapter 4 that fits slidably into the U-cross-sectional configuration of the respective stringer 5. In order to properly guide the adapter 4 in the stringer 5 the adapter is equipped with lateral guide ribs 4A which slidingly engage the inner wall surface of the respective stringer 5. Once in the proper position, the adapter 4 is interlocked with the crown in the seat rail 7.

As shown in FIGS. 1 and 3, the stringers 5 are preferably equipped with outwardly extending lateral flanges 9 to which floor panels 10 are mounted. Each stringer has a U-rail cross-section with a bottom web flanked by lateral side walls to the outside of which the flanges 9 are secured. As mentioned, the seat rail 7 is secured to the bottom web of the U-rail section of the stringer 5, either as an interal part of the bottom web, or by screws, rivets, welding or the like.

The locking members 8/8A as such are conventional and are used in aircraft on seat rails. Such locking members are able to fix roller carriers 13 shown in FIG. 4 or latch carriers 14 also shown in FIG. 4. The present adapter 4 shown in FIG. 1 secures a seat pallet 1 to the floor. Even seats S may be directly secured to the crown of the seat rail 7 by such conventional locking members. However, in FIG. 1, a seat leg is secured to the adapter 4 through the elements 2 and 3 as described.

FIG. 3 illustrates an embodiment wherein the roller carrier 13 is constructed as an adapter. The roller carrier 13 which carries at least one roller 12 functions insofar as an adapter as it permits securing the roller 12 to the crown of the seat rail 7 at the bottom of the U-rail forming the present stringers 5. FIG. 4 shows the adapters or roller carriers 13 secured to stringers 5 by the above mentioned locking members 8/8A. Either pallets or containers may now roll on these recessed rollers 12. The recessing gains up to 4 inches in the loading space height.

FIG. 4 also shows latch carriers 14 secured to the crown of the seat rail 7 of the present stringers 5 by the above mentioned locking members 8/8A.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A system for securing a support to an aircraft floor, comprising floor joists (11) for mounting in an aircraft body, at least one floor stringer (5) supported by said floor joists (11) and extending at an angle to said floor joists (11), said floor stringer (5) comprising two side walls and a bottom web interconnecting said side walls thereby forming an upwardly open U-cross-section and a seat rail (7) secured to said bottom web of said upwardly open U-cross-section, said seat rail (7) including a first interlock member secured to said bottom web of said upwardly open U-cross-section of said floor stringer (5), an adapter (4, 13) slidably fitting into said U-cross-section of said floor stringer (5), said adapter (4, 13) including a second interlock member (8A) for cooperating with said first interlock member (8) in interlocking said adapter (4, 13) with said seat rail inside said upwardly U-cross-section of said stringer (5), for reducing the structural vertical dimension of said floor stringer (5) and seat rail (7).

2. The system of claim 1, further comprising means (2; 3) for securing said support (1) to said adapter (4) which permits securing said support (1) to said floor stringer (5).

3. The system of claim 2, wherein said means for securing comprise a bolt and eye connector (2, 3) for connecting said adapter (4) to said support (1) to thereby latch a pallet as said support to said aircraft floor.

4. The system of claim 1, further comprising at least one roller member (12) rotatably mounted in said adapter (13), said roller member (12) fitting rotatably into said adapter (13) and projecting above said floor just sufficient for permitting moving said support on said roller member (12), whereby said support may be a pallet or a container bottom.

5. The system of claim 4, further comprising a journal pin (12A) mounting said roller member to said adapter (13) to rotatably hold said roller member (12) in said adapter (13).

6. The system of claim 1, wherein said first interlock member (8) of said seat rail (7) and said second interlock member (8A) of said adapter (4, 13) are tongue and groove members for interlocking said adapter (4, 13) with said seat rail (7).

7. The system of claim 1, wherein said side walls of said upwardly open U-cross-section of said stringers (5) comprise laterally outwardly extending flanges (9) for supporting floor panels (10).

8. The system of claim 1, wherein said angle between said stringers (5) and cross-joists (11) is about 90°.

9. The system of claim 1, wherein said support (1) is a pallet for carrying aircraft passenger seats.

10. The system of claim 1, wherein said support (1A) is a bottom of a freight container.

11. The system of claim 1, wherein said adapter (4) comprises lateral guide ribs (4A) for guiding said adapter (4) inside said open U-cross-section of said floor stringers (5).

12. A stringer for a floor grid construction of an aircraft, said stringer (5) comprising an open U-rail cross-section including a bottom web flanked by two lateral side walls and a seat rail (7) secured to said bottom web of said U-rail cross-section between said lateral side walls.

13. The stringer of claim 12, wherein each of said lateral side walls comprises a laterally outwardly extending flange (9) for supporting a floor.

14. The stringer of claim 12, wherein said seat rail is an integral part of said U-rail.

* * * * *

UNITED STATES PATENT AND TRADEMARK OFFICE
CERTIFICATE OF CORRECTION

PATENT NO. : 6,068,214
DATED : May 30, 2000
INVENTOR(S) : Kook

It is certified that error appears in the above-identified patent and that said Letters Patent is hereby corrected as shown below:

On the Title Page, under [73] Assignee:
"Daimler Chrysler Aerospace Airbus GmbH" should read:
-- DaimlerChrysler Aerospace Airbus GmbH--;

Col. 4, line 16, after "rail", delete "crown";
Col. 5, line 7, after "member", insert --(8)--;
line 10, after "said" (first occurrence), insert --upwardly open--;
line 14, after "upwardly", insert --open--.

Signed and Sealed this

Twenty-seventh Day of March, 2001

Attest:

NICHOLAS P. GODICI

Attesting Officer

Acting Director of the United States Patent and Trademark Office